United States Patent
Patel et al.

(10) Patent No.: US 8,718,097 B2
(45) Date of Patent: May 6, 2014

(54) RATE SELECTION FOR CHANNEL SELECTION IN FLEXIBLE WDM NETWORKS

(75) Inventors: Ankitkumar Patel, E. Brunswick, NJ (US); Philip Nan Ji, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 136 days.

(21) Appl. No.: 13/234,979

(22) Filed: Sep. 16, 2011

(65) Prior Publication Data

US 2012/0069856 A1 Mar. 22, 2012

Related U.S. Application Data

(60) Provisional application No. 61/384,123, filed on Sep. 17, 2010.

(51) Int. Cl.
*H04J 3/18* (2006.01)
*H04J 14/02* (2006.01)
*H04J 3/00* (2006.01)

(52) U.S. Cl.
CPC .............. *H04J 14/0227* (2013.01); *H04J 14/02* (2013.01)
USPC .......................................... 370/477; 370/498

(58) Field of Classification Search
None
See application file for complete search history.

(56) References Cited

U.S. PATENT DOCUMENTS

| | | | |
|---|---|---|---|
| 6,549,572 B1* | 4/2003 | Anderson et al. | 375/225 |
| 6,559,988 B1* | 5/2003 | Nielsen et al. | 398/82 |
| 8,095,011 B2* | 1/2012 | Yano et al. | 398/85 |
| 2006/0232848 A1* | 10/2006 | Xu et al. | 359/325 |
| 2009/0097849 A1* | 4/2009 | Childers et al. | 398/79 |
| 2009/0245395 A1* | 10/2009 | Suzuki et al. | 375/257 |
| 2011/0033188 A1* | 2/2011 | Elbers et al. | 398/79 |
| 2011/0085803 A1* | 4/2011 | Ji et al. | 398/79 |
| 2011/0280588 A1* | 11/2011 | Mikkelsen et al. | 398/202 |
| 2011/0318004 A1* | 12/2011 | Bruno | 398/45 |
| 2012/0195588 A1* | 8/2012 | Way | 398/4 |

\* cited by examiner

*Primary Examiner* — Eunsook Choi
(74) *Attorney, Agent, or Firm* — Joseph Kolodka

(57) ABSTRACT

An inventive method implemented in a communications system includes obtaining a first data rate in a flexible wavelength division multiplexing FWDM network and applying a recursive rate selection for determining a given data rate from the obtained first data rate such that a required spectrum over the FWDM network for the given data rate is minimized, the first data rate being lower than the given data rate.

5 Claims, 2 Drawing Sheets

RATE SELECTION FOR CHANNEL SELECTION IN FLEXIBLE WDM NETWORKS

This application claims the benefit of the following U.S. Provisional Application No. 61/384,123, entitled, "Rate Selection Procedure for Channel Selection in Flexible WDM Networks", filed Sep. 17, 2010, of which the contents is incorporated herein by reference.

BACKGROUND OF THE INVENTION

The present invention relates generally to broadband communications and more particularly to rate selection procedure for channel selection in flexible wavelength division multiplexing WDM networks.

In conventional wavelength division multiplexing (WDM) optical networks, the spectrum allocation to the WDM channels (determined from the channel spacing) is fixed, and remains the same throughout the network operation. These channels are centered on standard ITU-T channel grid such as specified according to ITU-T standard G.694.1 [ITU-T]. We refer such networks as the fixed grid optical WDM networks. In the fixed grid networks, the fixed amount of spectrum is assigned to all connections irrespective of their data rates, which leads to an inefficient utilization of spectral resources (FIG. 1(a)). Such a network is rigid and cannot provide optimum spectral efficiency.

Envisioning the requirement for higher spectral efficiency to support future traffic volume, there have been several efforts for relaxing the constraints of fixed spectral allocation in the optical WDM networks, which we refer as the Flexible optical WDM networks (FWDM). The FWDM consists of optical channels supporting heterogeneous line rates using variable amount of spectrum as shown in FIG. 1(b) as opposed to the fixed grid networks.

In the fixed grid optical networks, fixed and same amount of spectrum is allocated to all channels. Thus the total required spectrum by the given set of channels can be determined as follows:

Total Spectrum=Number of channels in the given set*spectrum of a channel.

Since the spectrum of all channels is fixed and the same, to minimize the total spectrum, we need to minimize the total number of channels required for the given data rate. Thus, the object of the channel selection problem is equivalent to minimize the total number of channels to support the connection. The channel selection problem in the fixed grid network can trivially solved by selecting the channels with the maximum line rate, which minimizes the total number of channels for the given data rate.

However, since the spectrum assignment to the channels in the FWDM networks is flexible, the channel selection problem becomes more general than in the fixed grid networks. The solution of the channel selection problem in the fixed grid networks may not be the solution of the channel selection problem in the FWDM networks.

For example, if an end user requests a connection of 410 Gb/s data rate from San Francisco to New York, and the FWDM network consists of multiple channels supporting 10 Gb/s, 40 Gb/s, 100 Gb/s, and 400 Gb/s line rates with the required spectrum 25 GHz, 50 GHz, 50 GHz, and 75 GHz respectively. The aforementioned solution of the channel selection problem in the fixed grid network selects the channels with maximum line rate to reduce the number of channels, which requires 2 channels, each of them with the line rate 400 Gb/s, which is the maximum among the given set of line rates, and the total required spectrum is 150 GHz. However, if we intelligently select one channel with line rate 400 Gb/s and the other channel with line rate 10 Gb/s, then the total required spectrum is reduced to 100 GHz.

So far, there is no existing solution (prior art) for the channel selection problem in the FWDM network, and we are the first one who introduce the channel selection problem, and propose the efficient procedure to solve it.

Accordingly, there is a need for an efficient channel selection in a flexible WDM (FWDM) network.

BRIEF SUMMARY OF THE INVENTION

The present invention is directed to an efficient procedure for the channel selection problem in an FWDM network using the recursive method, which we refer to as the rate selection procedure. In the proposed recursive procedure, the solution of the given data rate is obtained using the solution of the lower data rates than the given data rates.

An inventive method implemented in a communications system includes obtaining a first data rate in a flexible wavelength division multiplexing FWDM network and applying a recursive rate selection for determining a given data rate from the obtained first data rate such that a required spectrum over the FWDM network for the given data rate is minimized, the first data rate being lower than the given data rate.

A more specific aspect of the inventive method implemented in a communications system includes obtaining a first data rate in a flexible wavelength division multiplexing FWDM network, and applying a recursive rate selection for determining a given data rate from the obtained first data rate such that a required spectrum over the network for the given data rate is minimized, the first data rate being lower than the given data rate; the recursive rate selection including determining a spectrum and a set of channels required for the given data rate using a spectrum and set of channels required for the first data rate, wherein if an optimal said spectrum and set of channels are known for each said first data rate lower than said given data rate, then an optimal said spectrum for said data rate being obtainable.

These and other advantages of the invention will be apparent to those of ordinary skill in the art by reference to the following detailed description and the accompanying drawings.

DETAILED DESCRIPTION

The present invention is directed to an efficient procedure for the channel selection problem in the FWDM network using the recursive method, which we refer as the rate selection procedure. In the proposed recursive procedure, the solution of the given data rate is obtained using the solution of the lower data rates than the given data rates.

The inventive technique is applicable in the control plane of the FWDM network, which helps in finding the line rates of connections before establishing them through signaling procedure. Since the rate selection procedure is a part of a control plane, the proposed procedure can be used in distributed elements such as optical nodes, or centralized elements such as the Path Computation Elements (PCEs).

The inventive rate selection procedure for the channel selection problem is recursive. We denote L as the set of line rates of channels in the FWDM network, $x_l$ as the required spectrum for a channel, operating at line rate l∈L, γ as the data rate of a requested connection, $X_n$ as the total required spectrum for data rate n, $x_l$ as the required spectrum for a channel, operating at line rate l∈L, $Y_n$ as the optimal set of line rates for channels that support data rate n, $q_n$ as the line rate of a channel to obtain the data rate n from the data rate n-$q_n$, and $p_n$ as the data rate from which the optimal solution of data rate n is obtained.

The procedure is to recursively determine the spectrum and set of channels required for data rate n using the spectrum and set of channels required for the data rate n', where n'<n. If the optimal spectrum and set of channels are known for each data rate n'<n, then the optimal spectrum for the data rate n can be obtained as follows.

$$X_n = 0 \text{ if } n \leq 0 \quad (1)$$

$$X_n = \min_{l \in L}[x_l + X_{n-l}] \text{ if } n > 0 \quad (2)$$

where n'=n-1. Suppose we are finding the solution for the data rate n, and we already obtained the optimal set of line rates for the data rates which are less than n. Let l'∈L is the line rate which results in the minimum spectrum using equation 2. The set of channels for the data rate n is $Y_n = Y_{n-l} \cup \{l'\}$. This procedure is repeated until n is equivalent to the requested data rate γ. The inventive procedure for the channel selection in the FWDM network is described in conjunction with a flow chart.

Figure 1:
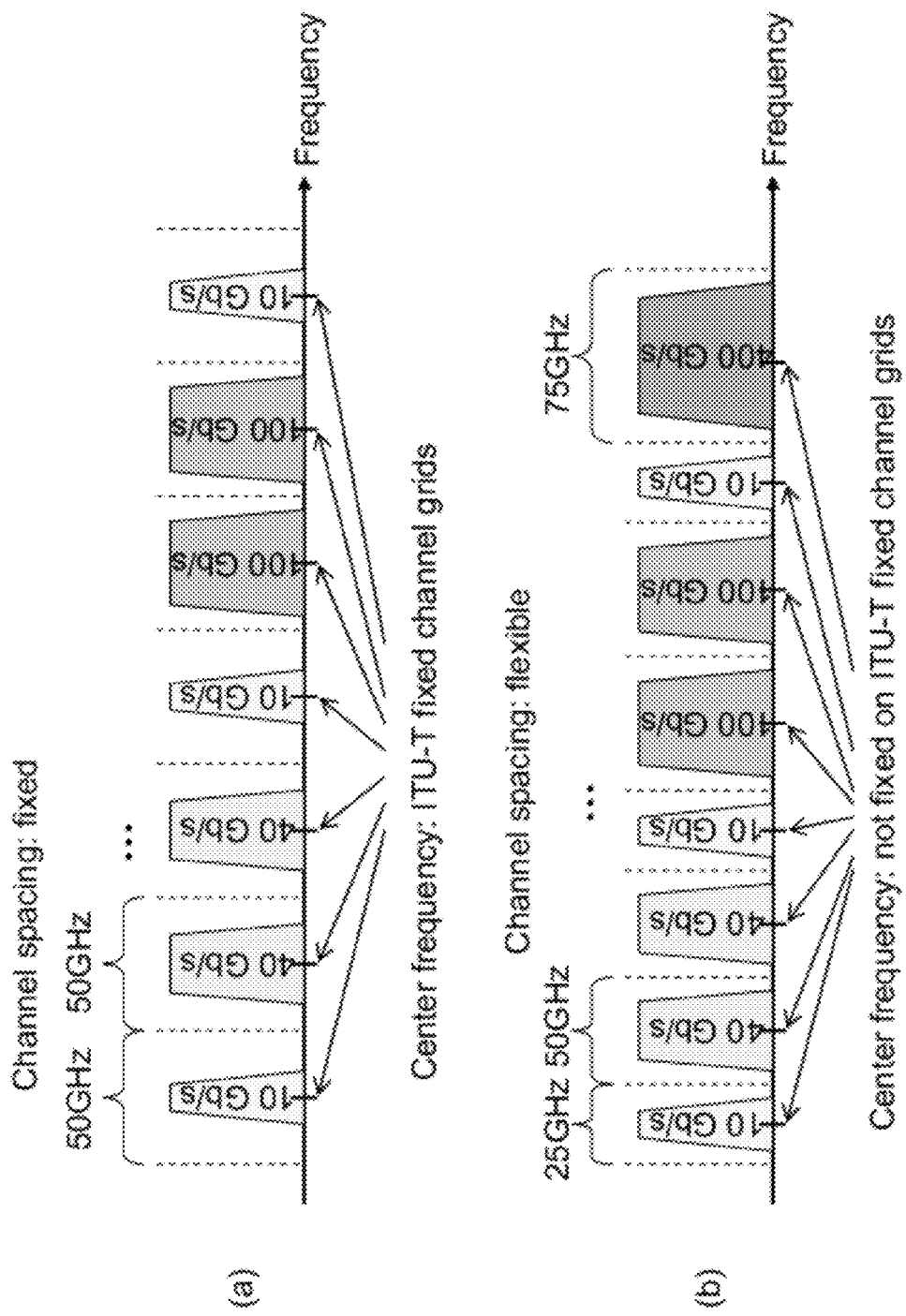
FIG. 1 depicts fixed transmission channel spacing and flexible transmission channel spacing to which the inventive method is directed.
Figure 2:
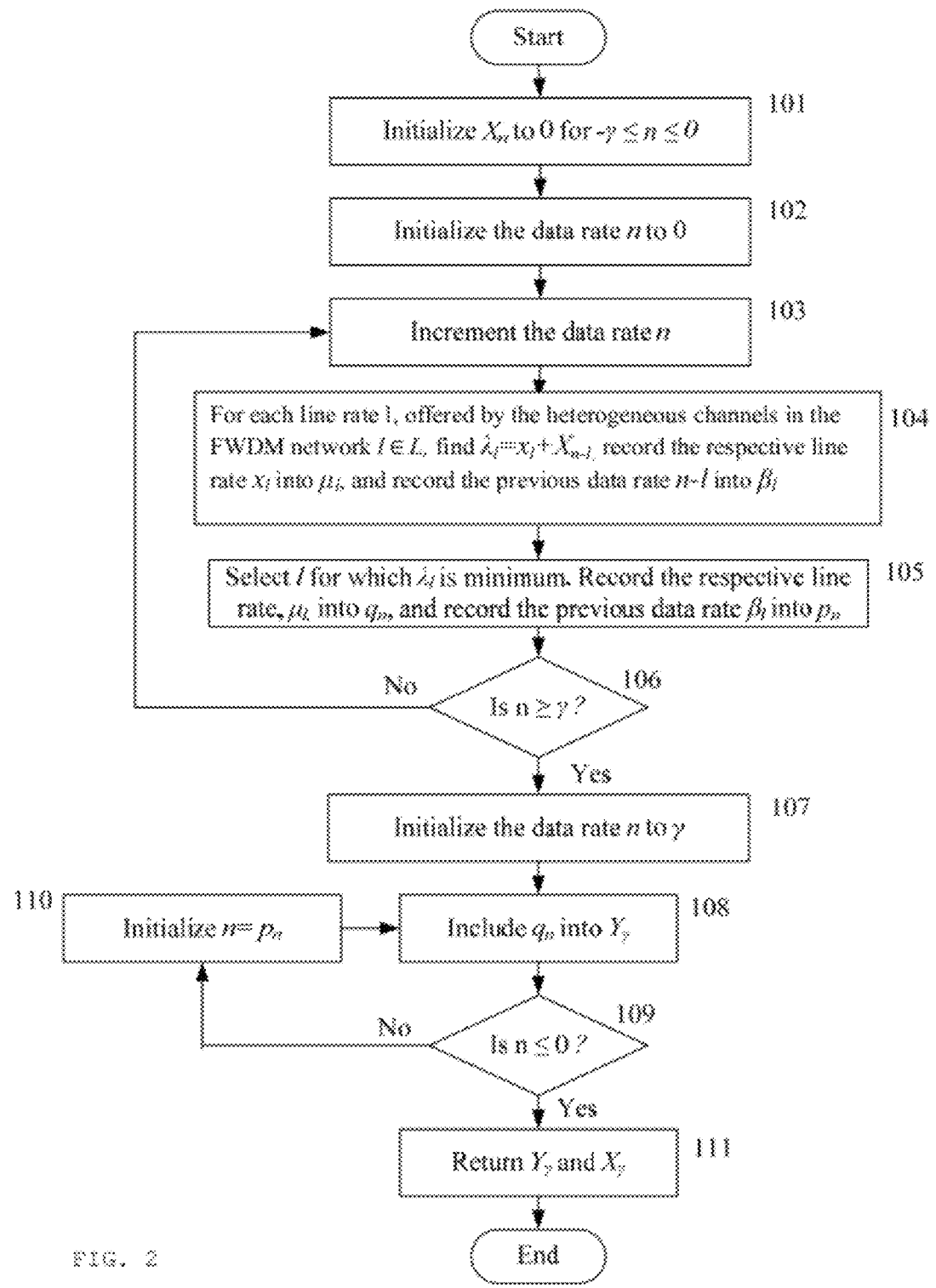
FIG. 2 is a flow diagram of a recursive procedure for finding an optimal set of channels and spectrum for a connection requesting data rate in FWDM networks, in accordance with the invention.

In FIG. 2, we illustrate the flowchart of the recursive procedure (Rate Selection Procedure) to find an optimal set of channels and spectrum for the connection requesting data rate γ(The Channel Selection Problem), and explain in detail as follows.

At step 101, the method initializes the required spectrum for the data rate n to zero, if the data rate is in between -γ, and 0, which is equivalent to equation 1.

At step 102, the method starts finding the optimal set of channels and spectrum from the data rate, which is equal to 0. Since the n=0 is the base case for which the optimal set of channels is empty and the total spectrum is 0 (from block 101).

At step 103 the method increments the data rate to n+1.

In the next step 104 there is always a positive data rate n, and the line rate of a channel, l∈L, is always positive, thus at this step n-l is always less than the n. the method has already determined the optimal spectrum $X_{n'}$, and the set of channels, $Y_{n'}$, for data rates n', where n'<n, before reaching at this step. In this step, the method finds the spectrum, $\lambda_l$, which is the total spectrum of a set of channels which consists of at least one channel with line rate l, which can be determined by using the existing solution of the data rate n-l. Thus, $\lambda_l = x_l + X_{n-l}$. the method finds $\lambda_l$ for all possible l within a set of line rates, L, offered by the FWDM networks. The method also records the line rate into $\mu_l$ whose spectrum is taken into account in determining $\lambda_l$, and the previous data rate n-l into $\beta_l$.

At step 105, the method finds the l that results in minimum $\lambda_l$, and records the respective $\mu_l$ into $q_l$ and $\beta_l$ into $p_n$. $q_n$ and $p_n$ record the line rate and the previous data rate which results in minimum spectrum.

At step 106, if the n is still less than the data rate of a connection, γ, then the method repeats the steps 103, 104, and 105. If n is already equivalent or greater than the requested data rate of a connection γ, then step 107 is followed.

At step 107, the method initializes n to the requested data rate of a connection, γ, followed by including the line rate, $q_n$, into the optimum set of channels $Y_γ$.108.

At step 109, the method checks whether n is less than or equal to 0. If n is positive, then the method follows step 110, otherwise step 111 is followed. At step 110 the method reinitializes the n to $p_n$, which is the previous data rate. At step 111, the method returns the optimal set of channels, $Y_γ$, and the optimal spectrum, $X_γ$, and the process is terminated.

From the foregoing, it can be appreciated that the inventive procedure always finds the set of line rates for a given connection such that the required spectrum is a minimum. This means that the solution provides the highest spectral efficiency. When applied in the FWDM network, this procedure allows higher data rate in each fiber, thus expands the traffic capacity in the network.

Comparing to the fixed grid network, the inventive method also reduces the energy consumption and the hardware cost.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented in a communications system and comprising the steps of:

obtaining, by a processor, a first data rate in a flexible wavelength division multiplexing FWDM network; and applying, by the processor, a recursive rate selection for determining a given data rate from the obtained first data rate such that a required spectrum over said network for said given data rate is minimized, said first data rate being lower than said given data rate;

wherein said recursive rate selection comprises recursively determining a spectrum and a set of channels required for data rate n using said spectrum and set of channels required for a data rate n', where n'<n, wherein if an optimal said spectrum and set of channels are known for each data rate n'<n, then said optimal spectrum for said data rate n being obtainable as follows:

$$X_n = 0 \text{ if } n \leq 0$$

$$X_n = \min_{l \in L}[x_l + X_{n-1}] \text{ if } n > 0,$$

where l denotes a channel line rate, n'=n-1, $X_n$ being a total required spectrum for data rate n, $x_l$ being a required spectrum for a channel operating at a line rate l∈L.

2. A method implemented in a communications system and comprising the steps of:

obtaining, by a processor, a first data rate in a flexible wavelength division multiplexing FWDM network; and applying, by the processor, a recursive rate selection for determining a given data rate from the obtained first data rate such that a required spectrum over said network for said given data rate is minimized, said first data rate being lower than said given data rate;

wherein said recursive rate selection comprises, for each line rate l, offered by heterogeneous channels in said FWDM network where l∈L with L being a set of line rates of channels in said FWDM network, finding $\lambda_l = x_{l+X_{n-l}}$, firstly recording a respective line ratio l into $\mu_l$ and recording a previous data rate n−1 into $\beta_l$, with $\lambda_l$ being a total spectrum of a set of channels which consists of at least one channel with line rate l which can be determined by using an existing solution of the data rate n−1, secondly recording of said line rate into $\mu_l$ whose spectrum is taken into account in determining $\lambda_l$, and thirdly recording a previous said data rate n−1 into $\beta_l$.

3. The method of claim 2, wherein said recursive rate selection comprises selecting line rate l for which $\lambda_l$ is a minimum and recording a respective said line rate $\mu_l$ into $q_n$ and recording a previous said data rate $\beta_l$ into $p_n$, resulting in a minimum said spectrum.

4. The method of claim 3, wherein said recursive rate selection comprises, if said data rate n is still less than a data rate of a connection, γ, incrementing said data rate n and repeating said firstly, secondly and thirdly recording steps.

5. The method of claim 3, wherein said recursive rate selection comprises:

initializing data rate n to a requested said data rate of a connection, γ;

including said line rate, $q_n$, into an optimum set of channels $Y_\gamma$; and checking whether said data rate n is less than or equal to 0, and if data rate n is positive then said data rate is reinitialized to $p_n$ which is said previous data rate; and returning said optimal set of channels $Y_\gamma$ and an optimal said spectrum, $X_\gamma$.

* * * * *